(12) United States Patent
Ko et al.

(10) Patent No.: US 12,154,573 B2
(45) Date of Patent: Nov. 26, 2024

(54) ELECTRONIC DEVICE AND CONTROL METHOD THEREOF

(71) Applicant: SAMSUNG ELECTRONICS CO., LTD., Suwon-si (KR)

(72) Inventors: Hyeonmok Ko, Suwon-si (KR); Sungchan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 17/427,452

(22) PCT Filed: Jan. 31, 2020

(86) PCT No.: PCT/KR2020/001495
§ 371 (c)(1),
(2) Date: Jul. 30, 2021

(87) PCT Pub. No.: WO2020/159288
PCT Pub. Date: Aug. 6, 2020

(65) Prior Publication Data
US 2022/0130392 A1    Apr. 28, 2022

(30) Foreign Application Priority Data

Feb. 1, 2019 (KR) .......................... 10-2019-0013418

(51) Int. Cl.
*G10L 15/26*      (2006.01)
*G06F 3/16*       (2006.01)
(Continued)

(52) U.S. Cl.
CPC ............... *G10L 15/26* (2013.01); *G06F 3/16* (2013.01); *G06F 21/602* (2013.01); *G10L 15/22* (2013.01)

(58) Field of Classification Search
CPC ......... G10L 15/26; G10L 15/22; G10L 25/48; G06F 3/16; G06F 21/602; G06F 3/165;
(Continued)

(56) References Cited

U.S. PATENT DOCUMENTS 8,749,807 B2   6/2014   Lee et al.
8,903,726 B2   12/2014  Cragun et al.
(Continued)

FOREIGN PATENT DOCUMENTS

JP          6298583 B2      3/2018
JP       2019211966 A      12/2019
(Continued)

OTHER PUBLICATIONS

Communication dated Oct. 27, 2021, issued by the Korean Intellectual Property Office in Korean Application No. 10-2019-0013418.

(Continued)

*Primary Examiner* — Yogeshkumar Patel
(74) *Attorney, Agent, or Firm* — Sughrue Mion, PLLC

(57) ABSTRACT

An electronic device is disclosed. An electronic device comprises: a communication interface including circuitry; and a processor for, when a user voice is received, providing a virtual secretary function of providing, by voice, response information corresponding to the received user voice, wherein the processor: identifies whether the response information corresponding to the user voice is privacy information; if the response information is identified to be privacy information, identifies whether a surrounding environment of the electronic device is a public environment; and if the surrounding environment is identified to be a public environment, controls the communication interface to transmit the response information to an external device.

17 Claims, 8 Drawing Sheets

(51) Int. Cl.
*G06F 21/60* (2013.01)
*G10L 15/22* (2006.01)

(58) Field of Classification Search
CPC ...... G06F 3/167; G06F 21/6245; G06F 31/32; H04M 1/72412; H04M 1/72454; H04M 2250/74
See application file for complete search history.

(56) References Cited

U.S. PATENT DOCUMENTS

| | | | |
|---|---|---|---|
| 9,749,730 | B2 | 8/2017 | Ryu et al. |
| 9,842,584 | B1 | 12/2017 | Hart et al. |
| 9,916,435 | B2 | 3/2018 | Fram |
| 10,198,594 | B2 | 2/2019 | Zhang et al. |
| 10,482,082 | B2 | 11/2019 | Seo et al. |
| 11,017,115 | B1* | 5/2021 | Young ..................... G10L 25/48 |
| 2002/0078204 | A1* | 6/2002 | Newell ............... G06F 21/6245 709/225 |
| 2005/0288981 | A1 | 12/2005 | Elias et al. |
| 2010/0058481 | A1 | 3/2010 | Yagita |
| 2013/0304817 | A1* | 11/2013 | Hu .................. H04N 21/41407 709/204 |
| 2014/0025443 | A1 | 1/2014 | Onischuk |
| 2014/0139439 | A1 | 5/2014 | Park |
| 2014/0365281 | A1 | 12/2014 | Onischuk |
| 2015/0012339 | A1 | 1/2015 | Onischuk |
| 2015/0178501 | A1 | 6/2015 | Robison et al. |
| 2016/0057553 | A1 | 2/2016 | Ryu et al. |
| 2016/0132553 | A1 | 5/2016 | Seo et al. |
| 2017/0220817 | A1 | 8/2017 | Shen et al. |
| 2018/0107839 | A1* | 4/2018 | Clement ................ G06F 3/017 |
| 2018/0144120 | A1 | 5/2018 | Fram |
| 2018/0330069 | A1* | 11/2018 | Quinn .................... G10L 15/22 |
| 2019/0304485 | A1 | 10/2019 | Hirano |
| 2019/0371308 | A1 | 12/2019 | Kinoshita |

FOREIGN PATENT DOCUMENTS

| | | |
|---|---|---|
| KR | 10-2004-0082769 A | 9/2004 |
| KR | 10-1308986 B2 | 9/2013 |
| KR | 10-2014-0064384 A | 5/2014 |
| KR | 10-1418286 B1 | 7/2014 |
| KR | 1020140123369 A | 10/2014 |
| KR | 1020160025059 A | 3/2016 |
| KR | 1020160056591 A | 5/2016 |
| KR | 10-2017-0050352 A | 5/2017 |
| KR | 10-1774236 B | 9/2017 |
| KR | 10-2018-0061423 A | 6/2018 |
| KR | 10-2018-0097760 A | 8/2018 |

OTHER PUBLICATIONS

Communication dated Nov. 11, 2021, from the European Patent Office in European Application No. 20748931.1.
International Search Report (PCT/ISA/210) issued May 13, 2020 by the International Searching Authority in counterpart International Patent Application No. PCT/KR2020/001495.
Written Opinion (PCT/ISA/237) issued May 13, 2020 by the International Searching Authority in counterpart International Patent Application No. PCT/KR2020/001495.
Examination Report dated Oct. 10, 2022, issued by the European Patent Office in App No. 20748931.1.
Extended European Search Report dated Oct. 9, 2023 issued by the European Patent Office in Counterpart European Application No. 20748931.1.
Communication issued on Jul. 8, 2024 by European Patent Office in European Application No. 20748931.1.

* cited by examiner

ELECTRONIC DEVICE AND CONTROL METHOD THEREOF

TECHNICAL FIELD

The disclosure relates to an electronic device providing different output methods of a virtual assistant function depending on surrounding environments and a method for controlling the same.

BACKGROUND ART

In recent years, various virtual assistant services using artificial intelligence agents (e.g., BIXBY™, ASSISTANT, ALEXA™, etc.) providing responses (answers) to user's inquiries are provided.

In general, virtual assistant services output the responses to the user's inquiries as a voice and provide the responses to the user. However, there is a problem that user's privacy is not protected by outputting private information that the user does not desire to open to another person as a voice.

DISCLOSURE

Technical Problem

The disclosure is made in view of the above needs and an object of the disclosure is to provide an electronic device variously performing methods for providing response information to a user's inquiry depending on a surrounding environment of the electronic device, when using a virtual assistant function, and a method for controlling the same.

Technical Solution

In accordance with an aspect of the disclosure for achieving the aforementioned object, there is provided an electronic device including a communication interface including circuitry, and a processor configured to, based on a user's voice being received, provide a virtual assistant function providing response information corresponding to the received user's voice as a voice.

The processor may be configured to identify whether the response information corresponding to the user's voice is privacy information, based on the response information being identified as the privacy information, identify whether a surrounding environment of the electronic device is a public environment, and based on the surrounding environment being identified as the public environment, control the communication interface to transmit the response information to an external device.

The electronic device may further include a memory storing type information corresponding to the privacy information, and the processor may be configured to identify whether the response information is the privacy information based on the type information stored in the memory.

The processor may be configured to, based on the response information being identified as the privacy information, identify a method for providing the response information based on a type of the response information, process the response information according to the identified providing method, and transmit the response information to the external device.

The method for providing the response information may include at least one of encryption of the response information, an output method of the response information, adjustment of an output volume of the response information, or output of at least a part of the response information.

The processor may be configured to search for at least one external device connected to the electronic device, and identify one of the at least one searched external device based on the identified method for providing the response information, and provide the processed response information to the identified external device.

The external device may be implemented as a private device of the user, and the private device may include at least one of a wearable device including augmented reality (AR) glasses or a smart watch, an earphone, or a headphone.

The processor may be configured to, based on the surrounding environment being identified as the public environment, identify a type of the response information, identify a providing time point of the response information based on the type of the response information, and control the communication interface to transmit the response information to the external device at the identified providing time point.

The electronic device may further include a camera, and the processor may be configured to identify the surrounding environment based on an image obtained by the camera.

The electronic device may further include a microphone, and the processor may be configured to identify information on a person around the electronic device based on sound information recorded through the microphone, and identify the surrounding environment based on the identified information.

The electronic device may further include a speaker, and the processor may be configured to control the speaker to output remaining information except for the privacy information from the response information.

The electronic device may further include a display, and the processor may be configured to, based on the surrounding environment being identified as the public environment, provide the response information via the display without providing the response information as the voice.

In accordance with another aspect of the disclosure for achieving the aforementioned object, there is provided a method for controlling an electronic device, the method including identifying whether response information corresponding to a user's voice is privacy information, based on the response information being identified as the privacy information, identifying whether a surrounding environment of the electronic device is a public environment, and based on the surrounding environment being identified as the public environment, transmitting the response information to an external device.

The identifying whether the response information is the privacy information may include identifying whether the response information is the privacy information based on pre-stored type information corresponding to the privacy information.

The transmitting the response information to the external device may include, based on the response information being identified as the privacy information, identifying a method for providing the response information based on a type of the response information, processing the response information according to the identified providing method, and transmitting the response information to the external device.

The method for providing the response information may include at least one of encryption of the response information, an output method of the response information, adjustment of an output volume of the response information, or output of at least a part of the response information.

The transmitting the response information to the external device may include searching for at least one external device connected to the electronic device, and identifying one of the at least one searched external device based on the identified method for providing the response information, and providing the processed response information to the identified external device.

The external device may be implemented as a private device of the user, and the private device may include at least one of a wearable device including augmented reality (AR) glasses or a smart watch, an earphone, or a headphone.

The transmitting the response information to the external device may include, based on the surrounding environment being identified as the public environment, identifying a type of the response information, identifying a providing time point of the response information based on the type of the response information, and transmitting the response information to the external device at the identified providing time point.

The identifying whether the surrounding environment is the public environment may include obtaining an image of the surrounding environment, and identifying the surrounding environment based on the obtained image.

The identifying whether the surrounding environment is the public environment may include obtaining sound information of the surrounding environment, identifying information on a person around the electronic device based on the obtained sound information, and identifying the surrounding environment based on the identified information.

The control method may further include outputting remaining information except for the privacy information from the response information.

The control method may further include, based on the surrounding environment being identified as the public environment, providing the response information via the display without providing the response information as the voice.

Effect of Invention

According to various embodiments of the disclosure as described above, the method for providing the response information to the user's inquiry is determined according to the surrounding environment of the electronic device, and therefore, the user's privacy may be protected.

BEST MODE

Detailed Description of Exemplary Embodiments

Figure 1:
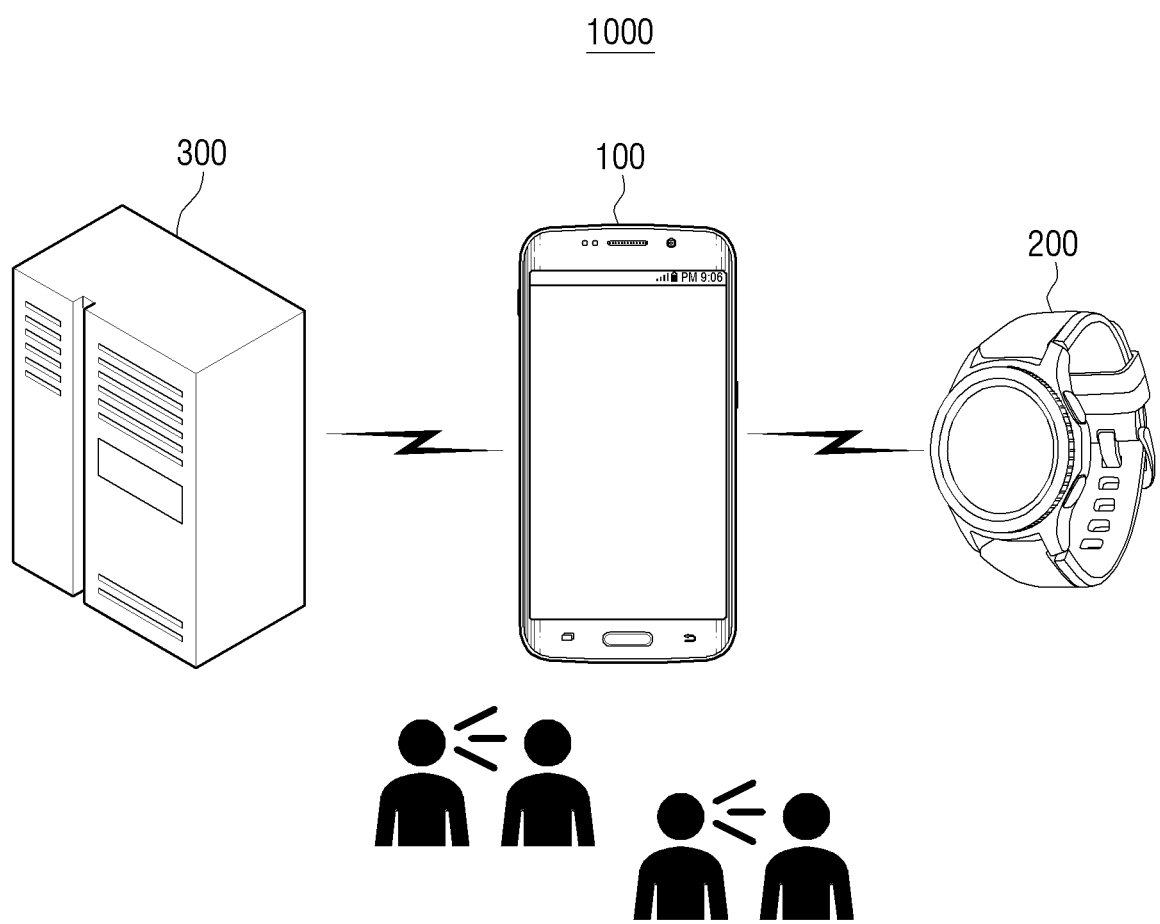
FIG. 1 is a diagram illustrating an electronic system according to an embodiment.

Hereinafter, the disclosure will be described in detail with reference to the accompanying drawings.

The disclosure will be described in greater detail below after briefly explaining the terms used in the disclosure.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

It should be understood that the expression such as "at least one of A or/and B" expresses any one of "A", "B", or "at least one of A and B".

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element).

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not illustrated). In this disclosure, a term "user" may refer to a person using an electronic device and a device using an electronic device (e.g., an artificial intelligence electronic device).

Hereinafter, with reference to the accompanying drawings, embodiments of the disclosure will be described in detail for those skilled in the art to easily practice the embodiments. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

Hereinafter, an embodiment of the disclosure will be described in greater detail with reference to the accompanying drawings.

FIG. 1 is a diagram illustrating an electronic system according to an embodiment.

An electronic system 1000 may include an electronic device 100, external device 200, and a server 300.

The electronic device 100 may provide a virtual assistant function and provide response information corresponding to a user's inquiry through the virtual assistant function. The electronic device 100 may be implemented in various forms such as a smartphone, a table PC, a mobile phone, a video phone, an electronic book reader, a desktop PC, a laptop PC, a netbook computer, a workstation, a server, a PDA, a portable multimedia player (PMP), an MP3 player, a medical device, a camera, or a wearable device.

The virtual assistant function herein may be a dedicated program for providing artificial intelligence (AI)-based services (e.g., voice recognition service, assistant service, translation service, search service, and the like) and may be executed by a general-purpose processor of the related art (e.g., CPU) or a separate AI-dedicated processor (e.g., GPU or the like). The virtual assistant function may be implemented as a system using an artificial intelligence agent such as BIXBY', ASSISTANT, or ALEXA™ and referred to as an AI assistant, a voice assistant, a virtual assistant, and the like, but will be collectively referred to as a virtual assistant, hereinafter, for convenience of description. The virtual assistant function may be executed, if a predetermined user's voice (e.g., "Bixby" or the like) is input or a button (e.g. button for executing the voice assistant) provided on the electronic device 100 is pressed. When a user's inquiry is input while executing the voice assistant function, the electronic device 100 may transmit this to the server 300 and receive response information corresponding to the user's inquiry from the server 300. Then, the electronic device 100 may output the received response information via a speaker (not illustrated). However, if the response information includes privacy information which is not desired to be open to another person, the electronic device 100 may provide the response information to the external device 200 without outputting the response information via the speaker, and the external device 200 may provide the response information to the user.

Here, the external device 200 may be implemented as a user's private device having a small area exposed to an external environment. For example, the external device 200 may include at least one of a wearable device including augmented reality (AR) glasses or a smart watch, an earphone, or a headphone.

The server 300 is a constituent element obtaining the response information corresponding to the user's inquiry. FIG. 1 illustrates the server 300 as one server, but this is merely an embodiment, and the server 300 may be implemented as various servers such as a server obtaining surrounding environment information of the electronic device 100, a server obtaining output information on an event, and the like. However, the electronic device 100 may not receive the response information from the server 300 and may obtain the response information directly.

Meanwhile, in the disclosure, various embodiments for protecting user's privacy such as transmitting response information including privacy information to the external device 200 by the electronic device 100 will be described in detail.

Figure 2:
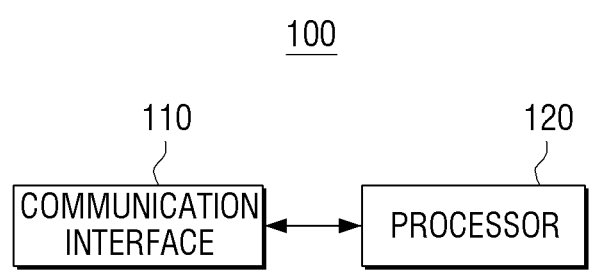
FIG. 2 is a block diagram illustrating operations of the electronic device according to an embodiment.

FIG. 2 is a block diagram illustrating operations of the electronic device according to an embodiment.

Referring to FIG. 2, the electronic device 100 may include a communication interface 110 and a processor 120.

The communication interface 110 including circuitry is a constituent element transmitting and receiving data with an external device 200 and the server 300.

In an example, the communication interface 110 is a constituent element transmitting data to the external device 200 and the server 300 according to wired/wireless communication methods. For example, the communication interface 110 may use communication methods such as Bluetooth (BT), wireless fidelity (Wi-Fi), Zigbee, infrared (IR), Ethernet, Serial Interface, Universal Serial Bus (USB), Mobile Industry Processor Interface Camera Serial Interface (MIPI CSI), Near Field Communication (NFC), Vehicle to Everything (V2X), and Cellular methods.

In particular, the communication interface 110 may receive response information from the server 300 and transmit the received response information to the external device 200.

The processor 120 may control general operations of the electronic device 100.

According to an embodiment of the disclosure, the processor 120 may be implemented as a digital signal processor (DSP), a microprocessor, and a time controller (TCON) processing digital signals. However, there is no limitation thereto, and the processor may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 120 may be implemented as System on Chip (SoC) or large scale integration (LSI) including the processing algorithm or may be implemented in form of a field programmable gate array (FPGA). The processor 120 may perform various functions by executing computer executable instructions stored in the memory 130.

When a user's voice is received, the processor 120 may provide a virtual assistant function providing response information corresponding to the received user's voice as a voice. When the electronic device 100 includes a microphone (not illustrated), a processor (not illustrated) provided in the microphone may digitize a received analogue voice signal to obtain a digital signal. The processor 120 may transmit the digital signal obtained from the microphone to a voice recognition related server (not illustrated) and recognize the user's voice based on the voice recognition result received from the voice recognition related server. The voice recognition related server herein may function as a speech-to-text (STT) server which converts a voice signal into a text. The STT server may convert the voice signal into a text and transmit the converted voice recognition result to the electronic device 100. In addition, the electronic device 100 may have the STT function and recognize the user's voice by converting the received user's voice into a text. Meanwhile, the specific operation procedure of the virtual assistant function providing the response information corresponding to the user's voice will be described with reference to FIG. 7.

Specifically, an operation of inputting a user's voice predetermined for executing the virtual assistant function (e.g., "Hi, Bixby", or the like) or pressing a button provided on the electronic device 100 (e.g., button for executing the voice assistant) may be performed in advance.

When the user's voice, that is, the inquiry is received through voice utterance, the processor 120 may obtain response information corresponding to the inquiry and provide the obtained response information as a voice via a speaker (not illustrated). For example, when the virtual assistant function is executed by "Hi, Bixby" and a user's voice "How's weather today?" is received, the processor 120 may obtain response information "Today is sunny" in response to the user's voice and provide this as a voice via the speaker. However, the user's voice corresponding to the user's inquiry may be input to the electronic device 100 by other means, not only as a voice. For example, the user's inquiry may be input to the electronic device 100 as a text "Today's weather". The processor 120 may receive the response information corresponding to the user's voice from the server 300 or obtain the response information directly.

Meanwhile, various embodiments of providing the response information, if the response information includes privacy information will be described.

The processor 120 may identify whether the response information corresponding the user's voice is the privacy information. Specifically, type information corresponding to the privacy information may be stored in the memory (not illustrated), and the processor 120 may identify whether the response information is the privacy information based on the type information. In other words, the processor 120 may identify whether the response information includes the privacy information.

Specifically, information of types such as a resident registration number, various passwords such as a password of a credit card, a password of a certificate, and a password of a web portal, home address, and the like may be stored as the privacy information. For example, if the response information includes the home address of the user, the processor 120 may identify the response information as the privacy information. Meanwhile, the information of the type corresponding to the privacy information described above is merely an example and the information of various types may correspond to the privacy information. For example, the information of various types such as a reservation number when completing hotel reservation, an authentication number for confirming identification, a personal customs clearance number, criminal record, political activities, a disability grade, union activity, asset condition, an account number, shopping history, and the like may correspond to the privacy information.

If the response information is identified as the privacy information, the processor 120 may identify whether the surrounding environment of the electronic device 100 is a public environment. The public environment may refer to an environment where the privacy is not protected such as a public place or a case where another person not registered is present.

According to an embodiment, the processor 120 may identify the surrounding environment based on an image obtained by a camera (not illustrated). In other words, the processor 120 may identify whether the surrounding environment is the public environment based on the obtained image.

For example, the processor 120 may detect a background region of the obtained image and identify whether the surrounding environment is the public environment. For example, if the background region is detected as a company, a train station, or a café, the processor 120 may identify the surrounding environment as the public environment. In addition, if the background region is detected as a house, a bedroom, a living room, or a kitchen, the processor 120 may identify the surrounding environment as not the public environment, but as the private environment. Meanwhile, the memory may store whether the space in the background region is in the public environment or the private environment. Simply, a house, a bedroom, a living room, a kitchen, and the like may be stored in the memory as the private environment, but images corresponding to a house, a bedroom, a living room, a kitchen, and the like of the user may be stored in the memory as images corresponding to the public environment. In this case, a house, a bedroom, and the like of another person may not be identified as the private environment, and the surrounding environment may be identified as the private environment, only when the user is in the house, the bedroom, or the like of the user.

Herein, in order to detect the background region, technologies such as scene description, place detection, and the like may be used, but such a technology is a technology of the related art, and therefore the detailed description thereof will be omitted.

The processor 120 may detect an object region of the obtained image and identify whether the surrounding environment is the public environment. For example, the processor 120 may identify information on a person included in the object region and identify the surrounding environment as the public environment, if a person other than the user is present. In addition, the processor may identify the information on the person and if the identified information coincides with registered information, the processor may identify the surrounding environment as the private environment. For example, information on family members of the user may be registered in advance, and accordingly, although at least one of the family members of the user is included in the obtained image, the processor 120 may identify the surrounding environment as the private environment. The information on the family members of the user may be registered as an image. In order to detect the object region, technologies of scene segmentation, object tracking, and object detection may be used, and when identifying information on a person included in the object region, technologies such as face detection, face recognition, and the like may be used, and such technologies are technologies of the related art, and therefore the detailed description thereof will be omitted.

Meanwhile, the user or the other registered person may be identified through gesture or iris recognition. For example, if the other person shows a predetermined gesture, the processor 120 may identify the other person as the other registered person and identify the current environment as the private environment. In addition, the processor may identify whether the other person is the other registered person based on the iris recognized through the camera. In this case, the iris of the corresponding other person needs to be registered in the electronic device 100 in advance.

However, there is no limitation thereto, and the user and the other person may be identified with a face shape such as the contour of a face, a body shape, and the like. Various embodiments other than the embodiment described above may be used, as long as the user and the other registered person are identified.

According to another embodiment, the processor 120 may identify information on a person positioned around the electronic device 100 based on sound information recorded through a microphone (not illustrated) and identify the surrounding environment based on the identified information. In other words, the processor 120 may identify whether the surrounding environment is the public environment based on the recorded sound information.

For example, the processor 120 may identify information on the person positioned around the electronic device based on a frequency of the recorded sound. Specifically, the processor 120 may identify a number of persons included in the recorded sound information based on voice signal processing technology and pattern recognition technology using the frequency. If a person other than the user is present, the processor 120 may identify the surrounding environment as the public environment. In addition, the processor may identify information on the person, and if the identified information coincides with the registered information, identify the surrounding environment as the private environment. For example, voice information on family members of the user may be registered in advance, and accordingly, although at least one of the family members of the user is included in the recorded sound information, the processor 120 may identify the surrounding environment as the private environment.

According to still another embodiment, the processor 120 may identify whether the surrounding environment is the public environment based on a current position obtained through a global positioning system (GPS) sensor (not illustrated). For example, if the current position obtained through the GPS sensor is identified as the user's house, the processor 120 may identify the surrounding environment as the private environment.

Meanwhile, according to the various embodiments, if the surrounding environment is identified as the public environment, the processor 120 may control the communication interface 110 to transmit the response information to the external device 200. The external device 200 may be implemented as a private device of the user and the private device may include at least one of a wearable device including augmented reality (AR) glasses or a smart watch, an earphone, or a headphone. The private device may refer to a device having a small area exposed to an external environment. The wearable device may include not only the AR glasses and the smart watch described above, but also at least one of an accessory type (e.g., a ring, a bracelet, an ankle bracelet, a necklace, a contact lens or a head-mounted-device (HMD)), a fabric or a garment-embedded type (e.g.: electronic cloth), skin-attached type (e.g., a skin pad or a tattoo), or a bio-implant type.

The response information may be processed by various methods and transmitted to the external device 200. Specifically, when the response information is identified as the privacy information, the processor 120 may identify (determine) the method for providing the response information based on the type of the response information and process the response information and transmit the response information to the external device 200 according to the identified providing method. The type of the response information may refer to a level of the privacy information. For example, the privacy information may be divided into information of a type in which a comparatively low privacy level is required (hereinafter, first level privacy information) and information of a type in which a comparatively high privacy level is required (hereinafter, second level privacy information). For example, the first level privacy information may include a home address, a phone number, a shopping history, and the like, and the second level privacy information may include a resident registration number, and various passwords such as a password of a credit card, a password of a certificate, a password of a web portal, and the like. However, this is merely an example and the privacy level may be further divided and the privacy information corresponding to each level may be changed.

In other words, the processor 120 may determine the providing method of the response information according to the level of the privacy information included in the response information. The providing method of the response information may include at least one of encryption of the response information, an output method of the response information, adjustment of an output volume of the response information, or output of at least a part of the response information.

For example, regarding the response information including the home address, the phone number, the shopping history, and the like, the processor 120 may output only at least a part of the response information or output the response information with a lowered output volume. In other words, if the response information corresponds to the first level privacy information, the processor 120 may provide the response information through a method for the user to easily recognize the desired information, although the response information may be exposed to the external environment with comparatively high possibility.

In addition, the processor 120 may provide the response information by encrypting the response information including the resident registration number, the password of the credit card, the password of the certificate, and the like. The encryption herein may include a code word method of changing a part or the entire information corresponding to the privacy information into another word or a synonym or an indirect word method for indirectly showing information corresponding to the privacy information. In other words, if the response information corresponds to the second level privacy information, the processor 120 may provide the response information through the method with comparatively low possibility that the response information is exposed to the external environment.

The processor 120 may provide the response information to the external device 200 by processing the response information based on a predetermined providing method, regardless of the level of the privacy information included in the response information.

Meanwhile, the processor 120 may search for at least one external device 200 connected to the electronic device 100, identify one of the at least one searched external device 200 based on the identified providing method of the response information, and provide the processed response information to the identified external device 200.

For example, if the providing method of the response information is identified as a method for providing the response information by lowering the output volume, the processor 120 may transmit the response information with the lowered output volume to a device including the speaker among the searched external devices 200. In an example, if an earphone or a smart watch is searched as the external device 200, the processor may transmit the response information with the lowered output volume to the earphone having a voice output function.

Meanwhile, it is described that the providing method of the response information is identified and the external device 200 is identified based on the identified providing method, but in some cases, the external device 200 may be identified first and then the providing method of the response information may be identified based on the identified external device 200. For example, if the external device 200 is identified as an earphone, the method for lowering the output volume may be determined as the providing method of the response information.

Meanwhile, if the surrounding environment is identified as the public environment, the processor 120 may identify the type of the response information and identify a providing time point of the response information based on the type of the response information. Then, the processor 120 may control the communication interface 110 so as to transmit the response information to the external device 200 at the identified providing time point.

For example, if it is identified that the response information includes the privacy information, the processor 120 may identify the providing time point of the response information as a time point when the surrounding environment is identified as the private environment.

The processor 120 may identify the providing time point of the response information according to the level of the privacy information. For example, if the response information includes the resident registration number, the password of the credit card, the password of the certificate, and the like, the processor 120 may identify the providing time point of the response information as the time point when the surrounding environment is identified as the private environment. In other words, if the response information corresponds to the second level privacy information, the processor 120 may not provide the response information before the surrounding environment is identified as the private environment.

In addition, if the response information includes the home address, the phone number, the shopping history, and the like, the processor 120 may process and provide the response information by the identified providing method, although the surrounding environment is not identified as the private environment.

In addition, the processor 120 may inquire the providing time point of the response information. For example, the processor 120 may inquire the providing time point of the response information by providing a UI for receiving the providing time point of the response information from the user on a display or through a voice.

In addition, the processor 120 may inquire whether the response information is provided. For example, if the response information includes the privacy information, the processor 120 may output a voice "Privacy information is included. Do you want to listen?" or provide an inquiry text through the display. Then, the processor 120 may perform an operation corresponding to the user's input. The above inquiry text is merely an example, and may be changed into various forms, as long as it has a content of inquiring whether to provide the response information.

Meanwhile, the processor 120 may control the speaker to output remaining information except for the privacy information from the response information. For example, if the response information for the user's voice includes not only the privacy information but also the public information, the processor 120 may output the remaining information except for the privacy information through the speaker. For example, the processor 120 may output a voice by muting the information corresponding to the privacy information or may not output a sentence including the privacy information as a voice.

According to the embodiment of the disclosure, the processor 120 may identify whether the surrounding environment is the public environment, when it is identified as the public environment, transmit the response information to the external device 200, and, when it is identified as the private environment, output the response information as a voice or through the display. In other words, it is described that the processor 120 identifies the current environment to determine the providing method of the response information.

However, there is no limitation thereto, and the processor 120 may not identify the environment and transmit and process the response information including the privacy information to the external device 200. For example, although the user is alone in a private space, if the response information includes the privacy information, the processor may process the response information by transmitting the repose information to the external device 200, as in a case where the surrounding environment is identified as the public environment.

Meanwhile, the embodiment in which, if the response information to the user's voice includes the privacy information and the surrounding environment is the public environment, the response information is transmitted to the external device 200 has been described above, but the processor 120 may provide the response information via the display provided in the electronic device 100, without transmitting the response information to the external device 200 and providing the response information as a voice. The information displayed on the display has a lower risk to be exposed to the other person than the information provided as a voice, and accordingly, the user's privacy may be protected, although the response information is not transmitted to the external device 200. In this case, the processor 120 may vibrate the electronic device 100 or provide a specific voice or sound to notify that the response information including the privacy information is displayed on the display.

Figure 3:
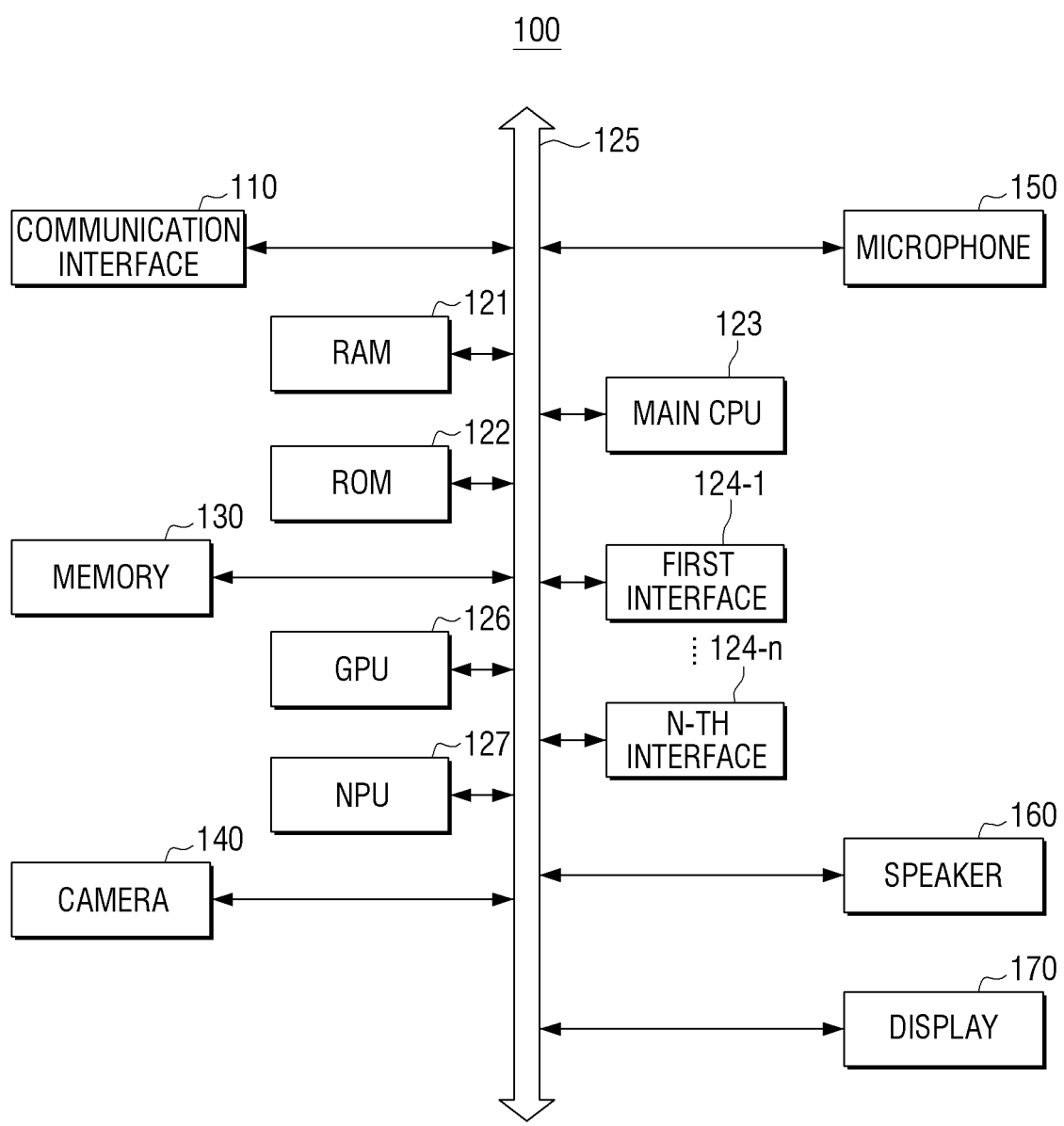
FIG. 3 is a block diagram illustrating a specific configuration of the electronic device.

FIG. 3 is a block diagram illustrating a specific configuration of the electronic device.

Referring to FIG. 3, the electronic device 100 may include the communication interface 110, the processor 120, the memory 130, a camera 140, a microphone 150, a speaker 160, and a display 170. The detailed description of the part of the configuration illustrated in FIG. 3 overlapped with the configuration illustrated in FIG. 2 will not be repeated.

The communication interface 110 is a constituent element communicating with the external device 200. The communication interface 110 may include a Wi-Fi module (not illustrated), a Bluetooth module (not illustrated), a local area network (LAN) module, a wireless communication module (not illustrated), and the like. Each communication module may be implemented as at least one hardware chip. The wireless communication module may include at least one communication chip for executing communication based on various wireless communication standards such as Zigbee, Ethernet, a universal serial bus (USB), Mobile Industry Processor Interface Camera Serial Interface (MIPI CSI), 3rd Generation (3G), 3rd Generation Partnership Project (3GPP), Long Term Evolution (LTE), LTE Advanced (LTE-A), 4th generation (4G), 5th generation (5G) and the like, in addition to the communication method described above. However, this is merely an embodiment, and the communication interface 110 may use at least one communication module among various communication modules, when the communication interface 110 communicates with the external device 200.

The processor 120 may generally control the operations of the electronic device 100 by using various programs stored in the memory 130.

Specifically, the processor 120 may include a RAM 121, a ROM 122, a main CPU 123, first to n-th interfaces 124-1 to 124-n, and a bus 125.

The RAM 121, the ROM 122, the main CPU 123, and the first to n-th interfaces 124-1 to 124-n may be connected to each other via the bus 125.

The ROM 122 may store a set of instructions for system booting. If a turn-on instruction is input to supply power, the main CPU 123 copies the O/S stored in the memory 130 to the RAM 121 and boots the system up by executing the O/S according to the instruction stored in the ROM 122. When the booting is completed, the main CPU 123 copies various application programs stored in the memory 130 to the RAM 121 and executes various operations by executing the application programs copied to the RAM 121. However, the RAM 121 and the ROM 122 may be implemented as external memories separated from the processor 120.

The main CPU 123 may execute the booting using the O/S stored in the memory 130 by accessing the memory 130. The main CPU 123 may execute various operations using various programs, contents, data, and the like stored in the memory 130. Particularly, according to an embodiment, the main CPU 123 copies the program in the memory 130 to the RAM 121 according to the instruction stored in the ROM 122, access the RAM 121, and execute the corresponding program.

The first to n-th interfaces 124-1 to 124-n may be connected to the various constituent elements described above. One of the interfaces may be a network interface connected to the external device through a network.

The GPU 126 may correspond to a high-performance processing device for graphic processing and may be a specialized electronic circuit designed to rapidly processing and changing the memory 130 to accelerate generation of an image in a frame buffer output as a screen. In addition, the GPU 126 may refer to a visual processing unit (VPU).

The NPU 127 may correspond to an AI chip set (or AI processor) and may be an AI accelerator. The NPU 127 may correspond to a processor chip optimized for performing deep neural network. Meanwhile, the NPU 127 may correspond to a processing device executing a deep learning model, instead of the GPU 126, and the NPU 127 may also correspond to a processing device executing the deep learning model together with the GPU 126.

Meanwhile, FIG. 3 illustrates all of the main CPU 123, the GPU 126, and the NPU 127, but, in the implementation, the processor 120 may be implemented and operated as one of the main CPU 123, the GPU 126, and the NPU 127.

The memory 130 may store the type information corresponding to the privacy information. Specifically, the information on types such as a resident registration number, various passwords such as a password of a credit card, a password of a certificate, and a password of a web portal, home address, and the like may be stored as the privacy information. In addition, the memory 130 may store the privacy information by dividing the levels of the privacy information. The first level privacy information in which a comparatively low privacy level is required may include a home address, a phone number, a shopping history, and the like, and the second level privacy information in which a comparatively high privacy level is required may include a resident registration number, and various passwords such as a password of a credit card, a password of a certificate, a password of a web portal, and the like. However, this is merely an example and the privacy level may be further divided and the privacy information corresponding to each level may be changed.

In addition, the information indicating which environment the space corresponding to the detected background region corresponds to among the private environment and the public environment may be stored in the memory 130. Further, the memory 130 may store images of a house, a bedroom, a living room, a kitchen, and the like of the user corresponding to the private environment.

Meanwhile, the memory 130 may be implemented as a separate memory of the processor 120. In this case, the memory 130 may be implemented as a memory embedded in the electronic device 100 or implemented as a memory detachable from the electronic device 100 according to the data storage purpose. For example, data for operating the electronic device 100 may be stored in a memory embedded in the electronic device 100, and data for an extended function of the electronic device 100 may be stored in a memory detachable from the electronic device 100. Meanwhile, the memory embedded in the electronic device 100 may be implemented as at least one of a volatile memory (e.g., dynamic RAM (DRAM)), a static RAM (SRAM), or a synchronous dynamic RAM (SDRAM) or the like), a non-volatile memory (e.g., one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a solid state drive (SSD), and the memory detachable from the electronic device 100 may be implemented in a form of a memory card (e.g., a compact flash (CF), a secure digital (SD), micro secure digital (Micro-SD), mini secure digital (Mini-SD), extreme digital (xD), multi-media card (MMC)), or an external memory connectable to a USB port (e.g., USB memory).

In addition, the memory 130 may be implemented as an internal memory such as a ROM (e.g., electrically erasable programmable read-only memory (EEPROM)) or a RAM included in the processor 120.

The camera 140 may obtain an image by capturing the surrounding environment. The camera 140 may capture the surrounding environment according to a user's command, but may also capture the surrounding environment based on a predetermined event, without the user's command. The predetermined event may include a case where a predetermined time elapses, a case where an illuminance of the surrounding environment changes to a predetermined threshold value or more, a case where movement to another space is identified based on information received from the GPS information, and the like. Meanwhile, the image captured by the camera 140 may be used to identify whether the surrounding environment is the public environment or the private environment.

The camera 140 may be implemented as a plurality of cameras such as a front camera provided on a front surface of the electronic device 100 and a rear camera provided on a rear surface of the electronic device 100.

The microphone 150 may be a constituent element for receiving the user's voice. In addition, the microphone 150 may be a constituent element for recording a sound of the surrounding environment.

The sound recorded by the microphone 150 may be used to identify whether the surrounding environment is the public environment or the private environment.

The speaker 160 may output not only various pieces of audio data obtained by executing various processing such as decoding, amplification, or noise filtering by an audio processor (not shown), but also various alerts or voice messages. Particularly, the speaker 160 may output the response information to the user's inquiry as a voice message in a form of natural language. In addition, the speaker 160 may provide a voice for receiving the providing time point of the response information from the user.

Meanwhile, the constituent element for outputting the sound may be implemented as the speaker, but this is merely an embodiment, and this may be implemented as an output terminal for outputting the audio data.

The display 170 may display various information according to the control of the processor 120. Particularly, the display 170 may display the response information corresponding to the user's voice. In addition, the display 170 may provide a UI for receiving the providing time point of the response information from the user.

The display 170 may be implemented in various forms of a liquid crystal display (LCD), organic light emitting diodes (OLED), Liquid Crystal on Silicon (LCoS), digital light processing (DLP), quantum dot (QD), micro light-emitting diode (micro LED) display, and the like. Particularly, the display 170 may be implemented as a touch screen forming a layer structure with a touch pad. In this case, the display 170 may be used as a user interface (not illustrated), in addition to the output device. The touch screen may be configured to detect not only a touch input position and an area, but also a touch input pressure.

In addition to the constituent elements described above, the electronic device 100 may further include a sensor (not illustrated).

The sensor may detect various state information of the electronic device 100. For example, the sensor may include a movement sensor for detecting movement information of the electronic device 100 (e.g., gyro sensor, acceleration sensor, or the like), and may include a sensor for detecting position information (e.g., global positioning system (GPS) sensor), a sensor for detecting environment information around the electronic device 100 (e.g., temperature sensor, humidity sensor, atmospheric pressure sensor, or the like), a sensor for detecting user information of the electronic device 100 (e.g., blood pressure sensor, blood sugar sensor, a pulse sensor, or the like), and the like.

Figure 4:
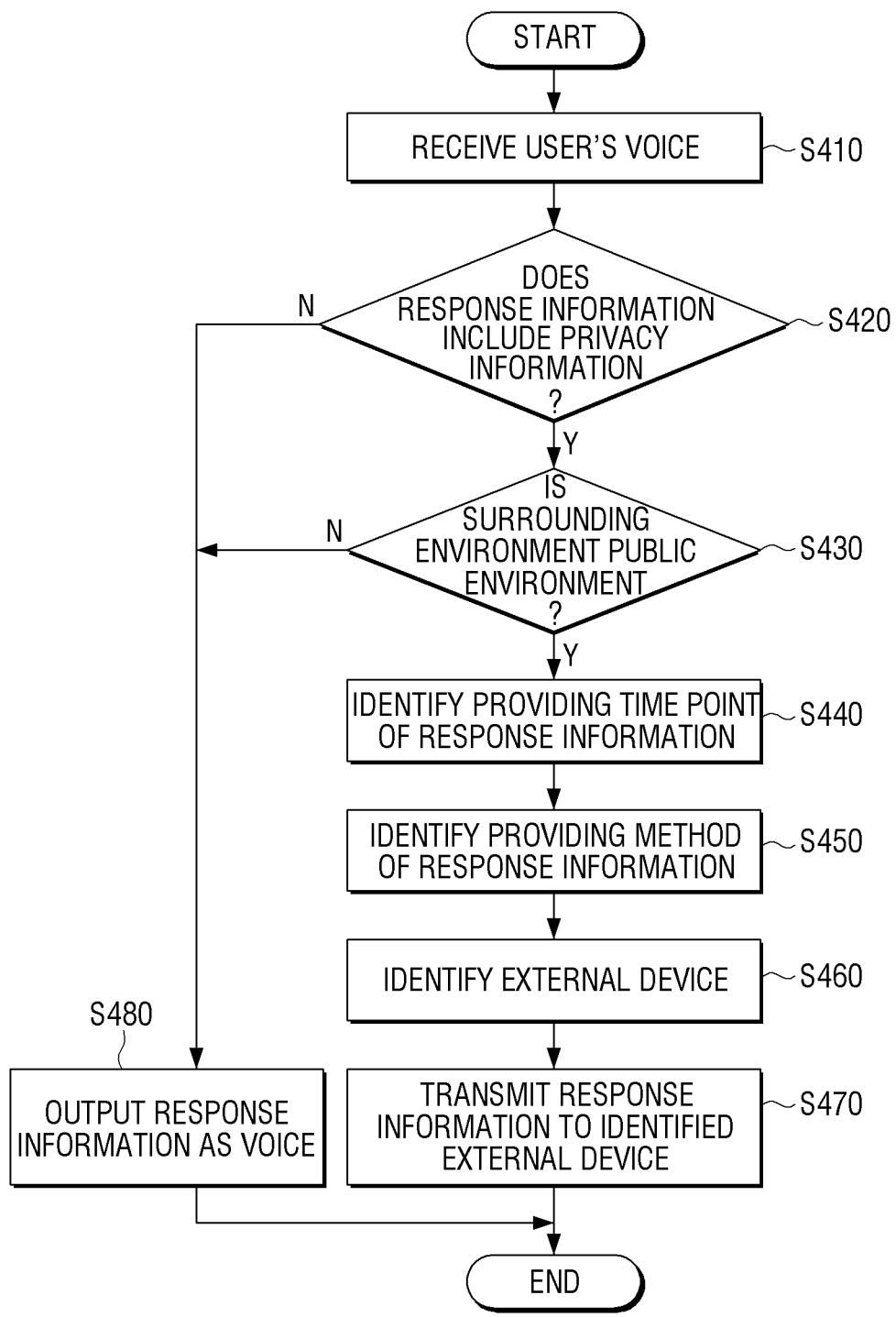
FIG. 4 is a flowchart illustrating operations of the electronic device for providing privacy information according to an embodiment.

FIG. 4 is a flowchart illustrating operations of the electronic device for providing privacy information according to an embodiment.

The electronic device 100 may receive a user's voice through the microphone 150 (S410). The user's voice may refer to a voice corresponding to the user's inquiry and the user's inquiry may be received by means other than the voice. In addition, in order to execute the virtual assistant function, an operation of inputting a predetermined user's voice (e.g., "Hi, Bixby", or the like) or pressing a button provided on the electronic device 100 (e.g., button for executing the voice assistant) may be performed in advance, before the user's inquiry is received.

The electronic device 100 may digitize the user's voice, that is, an analogue voice signal to obtain a digital signal. The electronic device 100 may transmit the obtained digital signal to a voice recognition related server (not illustrated) and recognize the user's voice based on the voice recognition result received from the voice recognition related server.

The voice recognition related server may have a function of a speech-to-text (STT) server converting the voice signal into a text. The STT server may convert a voice signal into a text and transmit a recognition result of the converted voice to the electronic device 100. Alternatively, the electronic device 100 may have an STT function and directly convert the received user's voice into a text to recognize the user's voice.

The electronic device 100 may receive the response information corresponding to the user's voice from the server 300 or obtain the response information directly. The electronic device 100 may identify whether the obtained response information includes the privacy information (S420). Specifically, the electronic device 100 may identify whether the response information includes the privacy information based on the type information.

If it is identified that the response information includes the privacy information (S420—Y), the electronic device 100 may identify whether the surrounding environment is the public environment (S430). For example, if the response information includes the credit card password of the user, the electronic device 100 may identify that the response information includes the privacy information.

The public environment may refer to an environment where the privacy is not protected such as a public place or a case where another person not registered is present. For example, the surrounding environment may be identified whether it is the public environment based on at least one of a background region or an object region included in an image obtained by the camera. In addition, the surrounding environment may be identified whether it is the public environment based on sound information recorded by the microphone.

If the surrounding environment is identified as the public environment (S430—Y), the electronic device 100 may identify the providing time point of the response information (S440). For example, if it is identified that the response information includes the privacy information, the electronic device 100 may identify the providing time point of the response information as the time point when the surrounding environment is identified as the private environment.

In addition, the electronic device 100 may identify the providing method of the response information based on the type of the response information (S450).

For example, regarding the response information including the home address, the phone number, the shopping history, and the like corresponding to the first level privacy information, the electronic device 100 may output only at least a part of the response information or output the response information with a lowered output volume. In addition, the electronic device 100 may provide the response information by encrypting the response information including the resident registration number, the password of the credit card, the password of the certificate, and the like corresponding to the second level privacy information.

The electronic device 100 may identify the external device 200 for providing the response information (S460) and transmit the response information to the identified external device 200 (S470). For example, if the providing method of the response information is identified as a method for providing the response information by lowering the output volume, the electronic device 100 may transmit the response information with the lowered output volume to a device including the speaker among the searched external devices 200. In an example, if an earphone or a smart watch is searched as the external device 200, the response information with the lowered output volume may be transmitted to the earphone having a voice output function.

Meanwhile, if the response information does not include the privacy information (S420—N) or if the surrounding environment is identified as not the public environment but the private environment (S430—N), the electronic device 100 may output and provide the obtained response information as a voice (S480).

Meanwhile, it is described that the providing method of the response information is identified and the external device 200 is identified based on the identified providing method, but in some cases, the external device 200 may be identified first and then the providing method of the response information may be identified based on the identified external device 200. In addition, it is described that the providing time point of the response information is identified before identifying the providing method of the response information, but the providing time point of the response information may be identified after identifying the providing method of the response information or after identifying the external device 200.

Figure 5:
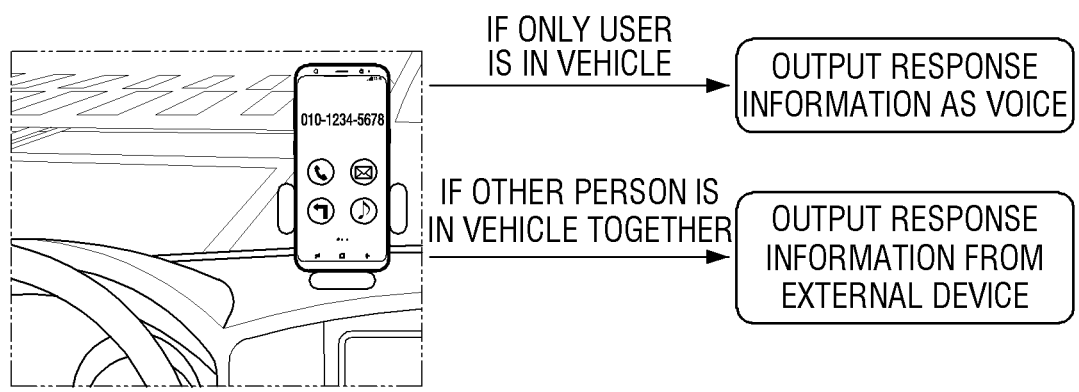
FIG. 5 is a diagram illustrating an operation of providing response information differently according to a private environment and a public environment according to an embodiment.

FIG. 5 is a diagram illustrating an operation of providing response information differently according to a private environment and a public environment according to an embodiment.

Referring to FIG. 5, it is assumed that a situation where the response information including the privacy information is to be provided to the user while the electronic device 100 (e.g., smartphone) is fixed on the inside of a vehicle. The electronic device 100 may identify whether the current situation is in the public environment, and provide the response information differently according to the identified result.

For example, if only the user is present in the image of the inside of the vehicle obtained through the camera 140, the electronic device 100 may identify the current surrounding environment as the private environment. In this case, the electronic device 100 may output the response information including the privacy information as a voice through the speaker 160.

In addition, if not only the user but also the other person is present in the image of the inside of the vehicle obtained through the camera 140, the electronic device 100 may identify the current surrounding environment as the public environment. In this case, the electronic device 100 may transmit the response information including the privacy information to the external device 200 and output the response information from the external device 200. For example, the electronic device 100 may provide the response information including the privacy information through the smart watch that the user is wearing, and the user may recognize the response information through the smart watch. As described above, although the other person is present in the vehicle, the user may obtain the privacy information through the external device 200 without exposing the privacy information to the other person.

Since it is assumed that, in FIG. 5, the electronic device 100 including the camera 140 is fixed to the inside of the vehicle to obtain the image of the inside of the vehicle, the electronic device 100 may identify the current surrounding environment based on the image data obtained through the camera 140. However, if the electronic device 100 is in a pocket of the user so that it is not able to capture the surrounding environment of the user, it may be identified whether the current surrounding environment is the public environment based on the sound recorded through the microphone 150. In addition, the current surrounding environment may be identified respectively based on data obtained through the camera 140 and the microphone 150. If the result of the identified surrounding environment includes at least one result identified as the public environment, the electronic device 100 may identify the current surrounding environment as the public environment. For example, it is assumed that, if the person other than the user does not utter, the information on the other person is not detected from the sound recorded through the microphone 150, but the other person is included in the image obtained through the camera 140. If the identification is based on the sound recorded through the microphone 150, the current surrounding environment may be identified as the private environment, but if the identification is based on the image obtained through the camera 140, the current surrounding environment may be identified as the public environment. In this case, the electronic device 100 may identify the current surrounding environment as the public environment.

Figure 6:
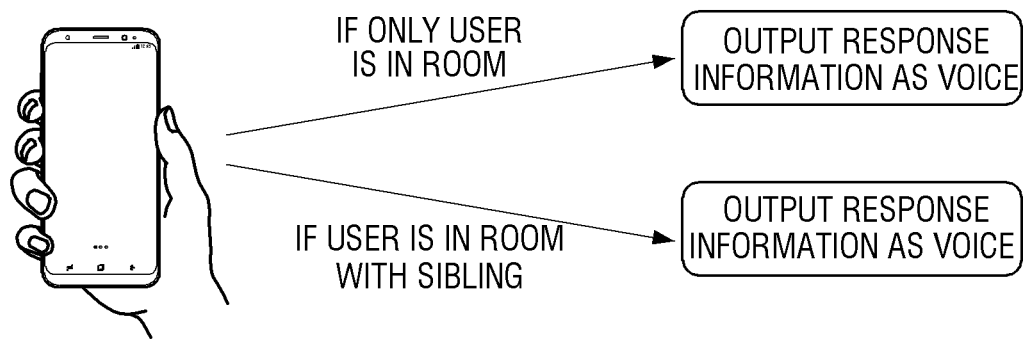
FIG. 6 is a diagram illustrating an operation of identifying the private environment or the public environment, if another registered person is present around a user according to an embodiment.

FIG. 6 is a diagram illustrating an operation of identifying the private environment or the public environment, if another registered person is present around a user according to an embodiment.

Referring to FIG. 6, it is assumed that the response information including the privacy information is to be provided to the user while the electronic device 100 (e.g., smartphone) is in a room.

For example, the electronic device 100 may identify the current position is the user's room based on the background region of the image obtained through the camera 140. In addition, if only the user is present in the obtained image, the electronic device 100 may identify the current surrounding environment as the private environment. In this case, the electronic device 100 may output the response information including the privacy information as a voice through the speaker 160.

Although the background region of the image obtained through the camera 140 is identified as the user's room, if the person other than the user is also present in the object region of the image, the electronic device 100 may identify the current surrounding environment as the public environment. However, if the other person is the person registered by the user, the electronic device 100 may identify the current surrounding environment as the private environment. For example, if an image of a user's sibling is input before identifying the surrounding environment and the same object as the input object is identified as the other person, the electronic device 100 may identify the corresponding object as the other registered person and identify the current surrounding environment as the private environment. Accordingly, the electronic device 100 may output the response information including the privacy information as a voice through the speaker 160. In other words, the other person registered by the user is a person who is fine with the privacy information, and accordingly, if the other registered person is present, the electronic device 100 may not process the response information by the other providing method.

If the image of the other person is not input before identifying the surrounding environment, the surrounding environment may be identified as the public environment, but if the user separately inputs the current surrounding environment as the private environment, the electronic device 100 may register the other person included in the obtained image.

It is described that the current surrounding environment is identified based on the image obtained through the camera 140, but the current surrounding environment may be identified based on the sound information recorded through the microphone 150. For example, if a voice of the user's sibling is input as a voice of the other registered person, the electronic device 100 may identify the current surrounding environment as the private environment, although the corresponding voice is detected in addition to the user's voice.

In addition, the surrounding environment may be identified through gesture or iris of the other person. For example, if it is identified that the other person is present around the user and the other person shows the predetermined gesture or the iris of the other person matches to the iris registered in advance, the electronic device 100 may identify the current environment as the private environment.

In addition, if a predetermined time section arrives, the electronic device 100 may identify the environment during the corresponding time section as the private environment. For example, it is assumed that the predetermined time section is set from 11 p.m. to 6 a.m. In this case, if it is 11 p.m., the electronic device 100 may output the response information through the speaker 160 or the display 170, although the response information includes the privacy information.

Figure 7:
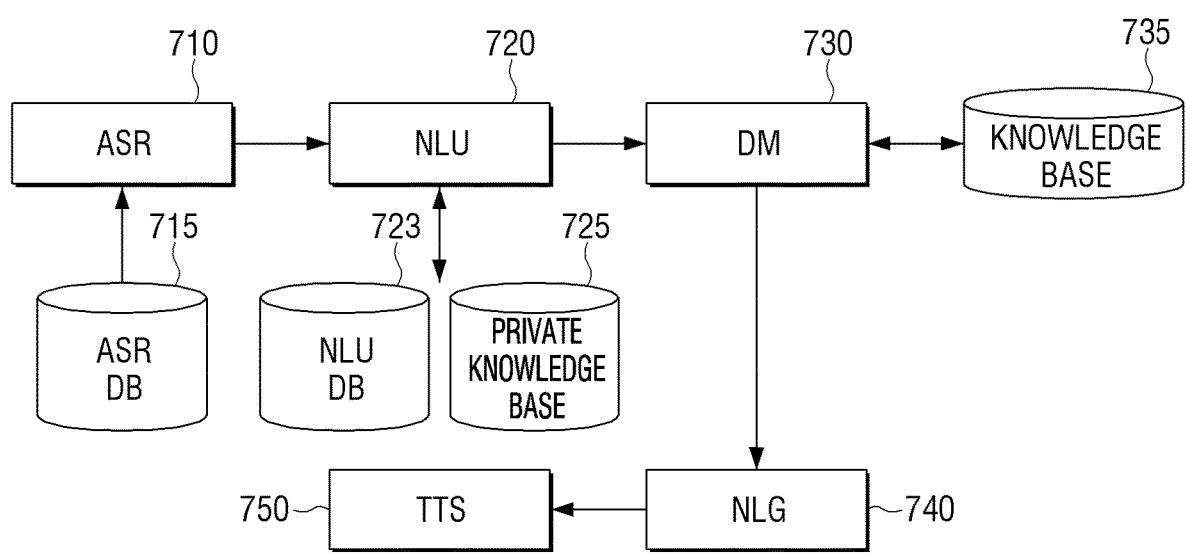
FIG. 7 is a diagram illustrating a dialogue system of a virtual assistant function for providing response information to a user's inquiry according to an embodiment.

FIG. 7 is a diagram illustrating a dialogue system of a virtual assistant function for providing response information to a user's inquiry according to an embodiment.

A dialogue system 700 illustrated in FIG. 7 is a configuration for allowing a dialogue with a virtual artificial intelligence agent in a natural language, and according to an embodiment of the disclosure, the dialogue system 700 may be stored in the memory 130 of the electronic device 100. However, this is merely an embodiment, and at least one configuration included in the dialogue system 700 may be included in the server 300.

Referring to FIG. 7, the dialogue system 700 may include an automatic speech recognition (ASR) module 710, a natural language understanding (NLU) module 720, a dialogue manager (DM) module 730, a natural language generator (NLG) module 740, and a text-to-speech (TTS) module 750. In addition, the dialogue system 700 may further include a path planner module or an action planner module.

The automatic speech recognition (ASR) module 710 may convert a user's voice (particularly, user's inquiry) received from the electronic device 100 into text data. For example, the automatic speech recognition module 710 may include an utterance recognition module. The utterance recognition module may include an acoustic model and a language model. For example, the acoustic model may include information related to vocalization and the language model may include unit phoneme information and information on a combination of unit phoneme information. The utterance recognition module may convert the user's utterance into the text data by using the information related to the vocalization and the information on the unit phoneme information. The information on the acoustic model and the language model may be, for example, stored in an automatic speech recognition database (ASR DB) 715.

The natural language understanding module 720 may perform syntactic analysis or semantic analysis to grasp the user's intent. In the syntactic analysis, a user input may be divided in a syntactic unit (e.g., word, phrase, morpheme, or the like) to grasp which syntactic elements the divided units include. The semantic analysis may be performed using semantic matching, rule matching, formula matching, and the like. Accordingly, the natural language understanding module 720 may obtain a domain, intent, or a parameter (or slot) necessary to express the intent, corresponding to the user input.

The natural language understanding module 720 may determine the user's intent and parameter by using a matching rule divided into the domain, the intent, and the parameter (or slot) necessary to grasp the intent. For example, one domain (e.g., alarm) may include a plurality of intents (e.g., setting alarm, turning alarm off, and the like), and one intent may include a plurality of parameters (e.g., time, repeating number of times, alarm sound, and the like). The plurality of rules may include, for example, one or more essential element parameters. The matching rule may be stored in a natural language understanding database (NLU DB) 723.

The natural language understanding module 720 may grasp meaning of a word extracted from the user input by using linguistic characteristics (e.g., syntactic element) such as morpheme or phrase, and determine the user's intent by matching the grasped meaning of the word to the domain and the intent. For example, the natural language understanding module 720 may determine the user's intent by calculating how many words extracted from the user input are included in each domain and intent. According to an embodiment, the natural language understanding module 720 may determine the parameter of the user input by using the word used to grasp the intent. According to an embodiment, the natural language understanding module 720 may determine the user's intent by using the natural language understanding database 723 storing the linguistic characteristics for grasping the intent of the user input.

The natural language understanding module 720 may understand the user's inquiry by using a private knowledge base 725. The private knowledge base 725 may learn relationships between pieces of knowledge information based on at least one of user profile information (including user preference information directly input by the user, in addition to personal information such as user's name, age, gender, body sizes, and the like), user interactions input to the electronic device 100, search history of the user, sensing information sensed by the electronic device 100, and user information received from an external device. The method for training the pieces of knowledge information may include a method for extracting knowledge from texts such as attribute extraction, entity extraction, relation extraction, co-reference resolution, and the like, and a linking operation to a pre-constructed knowledge base through entity disambiguation (connecting extracted knowledge to knowledge base) may be performed. In this case, a pre-trained language model may be used or probability modeling or an embedding technique may be used. In addition, the knowledge base completion through link prediction and the like may be performed.

The private knowledge base 725 may store objects, relations between the objects, and attributes of the objects in a form of a table or a graph and include data in which a plurality of relations or the attributes are stored in a specific object. Particularly, when the private knowledge base 725 is initially constructed, the electronic device 100 may construct the private knowledge base 725 by requesting an external server for knowledge associated with the information related to the user, in addition to various pieces of obtained information related to the user. The object may be referred to as a class, an entity, a parameter, and the like, and the attribute of the object may include an attribute type/name or an attribute value.

In addition, if new knowledge information is added, the private knowledge base 725 may receive additional information of the new knowledge information from the external server and store the knowledge information and the additional information as a graph.

Meanwhile, the private knowledge base 725 storing the knowledge information as a knowledge graph is merely an embodiment, and the private knowledge base may store the information in a form of data set.

The natural language understanding module 720 may determine the user's intent by using the private knowledge base 725. For example, the natural language understanding module 720 may determine the user's intent by using the user information (e.g., a preference phrase, a preference content, a contact list, a music list, and the like). According to an embodiment, not only the natural language understanding module 720, but also the automatic speech recognition module 710 may recognize the user's voice by referring to the private knowledge base 725.

The natural language understanding module 720 may generate a path rule based on the intent and the parameter of the user input. For example, the natural language understanding module 720 may select an application to be executed based on the intent of the user input and determine an operation to be performed on the selected application. The natural language understanding module 720 may generate the path rule by determining the parameter corresponding to the determined operation. According to an embodiment, the path rule generated by the natural language understanding module 720 may include information on the application to be executed, the operation to be performed on the application, and a parameter necessary to perform the operation.

The natural language understanding module 720 may generate one path rule or a plurality of path rules based on the intent and parameter of the user input. For example, the natural language understanding module 720 may receive a path rule set corresponding to the electronic device 100 from a path planner module, and map the intent and the parameter of the user input to the received path rule set to determine the path rule. The path rule may include information on the operation for performing the function of the application or information on the parameter necessary to perform the operation. In addition, the path rule may include the order of the operations of the application. The electronic device 100 may receive the path rule, select the application according to the path rule, and perform the operation included in the path rule on the selected application.

The natural language understanding module 720 may generate one path rule or a plurality of path rules by determining the application to be executed based on the intent and the parameter of the user input, the operation to be performed on the application, and the parameter necessary to perform the operation. For example, the natural language understanding module 720 may generate the path rule by arranging the application to be executed and the operation to be performed on the application in a form of ontology or a graph model according to the intent of the user input by using the information of the electronic device 100. The generated path rule may be stored in a path rule database through, for example, the path planner module. The generated path rule may be added to the path rule set of the database 723.

The natural language understanding module 720 may select at least one path rule among the plurality of generated path rules. For example, the natural language understanding module 720 may select an optimal path rule among the plurality of path rules. According to another example, the natural language understanding module 720 may select a plurality of path rules, if only a part of operation is specified based on the user's utterance. The natural language understanding module 720 may determine one path rule among the plurality of path rules by the additional user input.

The dialogue manager module 730 may determine whether the user's intent grasped by the natural language understanding module 720 is clear. For example, the dialogue manager module 730 may determine whether the user's intent is clear based on whether the information of the parameter is sufficient. The dialogue manager module 730 may determine whether the parameter grasped by the natural language understanding module 720 is sufficient to perform a task. According to an embodiment, the dialogue manager module 730 may give a feedback for requesting for information necessary for the user, if the user's intent is not clear. For example, the dialogue manager module 730 may give a feedback for requesting information on a parameter for grasping the user's intent. In addition, the dialogue manager module 730 may generate and output a message for confirming the user's inquiry including a text changed by the natural language understanding module 720.

According to an embodiment, the dialogue manager module 730 may include a content provider module. The content provider module may generate a result obtained by performing a task corresponding to the user input, if the natural language understanding module 720 may perform an operation based on the grasped intent and the parameter.

According to another embodiment, the dialogue manager module 730 may provide a response to the user's inquiry by using the knowledge base 735 or the private knowledge base 725. The knowledge base 735 may be included in the electronic device 100, but this is merely an embodiment, and the knowledge base may be included in the external server.

The natural language generator module 740 may change designated information into a text form. The information changed into a text form may be in a form of natural language utterance. The designated information may be, for example, information on additional input, information guiding completion of the operation corresponding to the user input, or information guiding additional input of the user (e.g., feedback information on user input). The information changed into a text form may be displayed on the display 170 of the electronic device 100 or changed to a voice by the text-to-speech module (TTS module) 750.

The text-to-speech module (TTS module) 750 may change the information in a text form to information in a voice form. The text-to-speech module 750 may receive the information in a text form from the natural language generator module 740, change the information in a text form to the information in a voice form, and output the information through a speaker.

The natural language understanding module 720 and the dialogue manager module 730 may be implemented as one module. For example, the natural language understanding module 720 and the dialogue manager module 730 may be implemented as one module, determine the user's intent and parameter, and obtain a response (e.g., path rule) corresponding to the determined user's intent and parameter.

Figure 8:
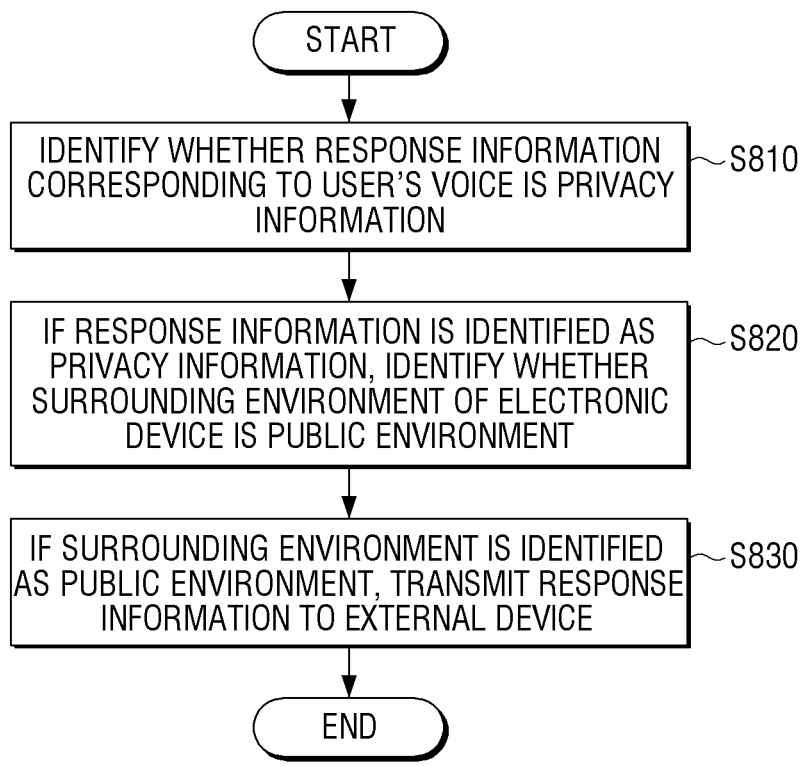
FIG. 8 is a flowchart illustrating a method for controlling the electronic device according to an embodiment.

FIG. 8 is a flowchart illustrating a method for controlling the electronic device according to an embodiment.

The electronic device 100 may identify whether the response information corresponding to the user's voice is privacy information (S810).

Specifically, the electronic device 100 may identify whether the response information is the privacy information based on pre-stored type information corresponding to the privacy information. For example, information of types such as a resident registration number, various passwords such as a password of a credit card, a password of a certificate, and a password of a web portal, home address, and the like may be stored as the privacy information. In an example, if the response information includes homme address of the user, the electronic device 100 may identify that the response information is the privacy information.

If the response information is identified as the privacy information, the electronic device 100 may identify whether the surrounding environment of the electronic device 100 is the public environment (S820).

Specifically, the electronic device 100 may obtain an image of the surrounding environment and identify the surrounding environment based on the obtained image. Specifically, the electronic device 100 may detect a background region and an object region of the obtained image and identify whether the surrounding environment is the public environment based on at least one of the detected background region or object region.

In addition, the electronic device 100 may obtain sound information of the surrounding environment, identify information on a person around the electronic device 100 based on the obtained sound information, and identify the surrounding environment based on the identified information. The processor 120 may identify the presence of a person other than the user based on a frequency of the recorded sound and identify whether the surrounding environment is the public environment.

If the surrounding environment is identified as the public environment, the electronic device 100 may transmit the response information to the external device (S830). The external device 200 may be implemented as a private device of the user and the private device may include at least one of a wearable device including augmented reality (AR) glasses or a smart watch, an earphone, or a headphone.

Specifically, if the response information is identified as the privacy information, the electronic device 100 may identify a method for providing the response information based on the type of the response information, process the response information according to the identified providing method, and transmit the response information to the external device 200. Herein, the method for providing the response information may include at least one of encryption of the response information, an output method of the response information, adjustment of an output volume of the response information, or output of at least a part of the response information.

In addition, the electronic device 100 may search for at least one external device 200 connected to the electronic device 100, identify one of the at least one searched external device 200 based on the identified method for providing the response information, and provide the processed response information to the identified external device 200.

In addition, if the surrounding environment is identified as the public environment, the electronic device 100 may identify the type of the identified response information, identify the providing time point of the response information based on the type of the response information, and transmit the response information to the external device 200 at the identified providing time point.

Meanwhile, the electronic device 100 may output remaining information except for the privacy information from the response information. For example, if the response information to the user's voice includes not only the privacy information but also the public information, the electronic device 100 may output the remaining information except for the privacy information via the speaker 160. In an example, the electronic device 100 may output a voice by muting the information corresponding to the privacy information or may not output a sentence including the privacy information as a voice.

Meanwhile, the embodiment in which, if the response information to the user's voice includes the privacy information and the surrounding environment is the public environment, the response information is transmitted to the external device 200 has been described above, but the electronic device 100 may provide the response information via the display 170 provided in the electronic device 100, without transmitting the response information to the external device 200 and providing the response information as a voice. The information displayed on the display 170 has a lower risk to be exposed to the other person than the information provided as a voice, and accordingly, the user's privacy may be protected, although the response information is not transmitted to the external device 200. In this case, the electronic device 100 may vibrate or provide a specific voice or sound to notify that the response information including the privacy information is displayed on the display 170.

The specific operation of each step has been described above, and therefore the detailed description thereof will not be repeated.

Meanwhile, the methods according to various embodiments of the disclosure described above may be implemented in a form of an application installable in the electronic device of the related art.

In addition, the methods according to the various embodiments of the disclosure described above may be implemented simply by the software upgrade or hardware upgrade in the electronic device of the related art.

Further, the embodiments of the disclosure described above may be performed through an embedded server provided in the electronic device or an external server of the electronic device.

Meanwhile, according to an embodiment, various embodiments of the disclosure may be implemented as software including instructions stored in machine (e.g., computer)-readable storage media. The machine is a device which invokes instructions stored in the storage medium and is operated according to the invoked instructions, and may include the electronic device according to the embodiments described above. In a case where the instruction is executed by a processor, the processor may perform a function corresponding to the instruction directly or using other elements under the control of the processor. The instruction may include a code made by a compiler or a code executable by an interpreter. The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment of the disclosure, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

The embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor, the computer instructions may enable a specific machine to execute the processing operations according to the embodiments described above.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration. Operations performed by a module, a program, or other elements, in accordance with various embodiments, may be performed sequentially, in a parallel, repetitive, or heuristically manner, or at least some operations may be performed in a different order, omitted, or may add a different operation.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. A mobile electronic device comprising:
   a communication interface comprising circuitry;
   memory storing instructions; and
   at least one processor configured to, based on a user voice being received, provide a virtual assistant function providing response information to the user voice, wherein the at least one processor is configured to execute the instructions to:
   identify whether the response information is privacy information;
   based on the response information being identified as the privacy information, identify whether a surrounding environment of the mobile electronic device is a public location based on at least one of an image of the surrounding environment, sound information of the surrounding environment or a current position of the mobile electronic device; and
   based on the surrounding environment being identified as the public location, identify a providing time point of the response information and control the communication interface to transmit the response information to an external device at the providing time point, wherein the providing time point is when the surrounding environment is identified as a private location.

2. The mobile electronic device according to claim 1:
   wherein the memory stores type information corresponding to the privacy information, and
   wherein the at least one processor is configured to execute the instructions to identify whether the response information is the privacy information based on the type information stored in the memory.

3. The mobile electronic device according to claim 1,
   wherein the at least one processor is configured to execute the instructions to, based on the response information being identified as the privacy information, for a first type of the privacy information, provide the response information using a first response method, and for a second type of the privacy information different from the first type of the privacy information, provide the response information using a second response method different from the first response method, and
   wherein the first response method and the second response method each comprise at least one of encryption of the response information, an output method of the response information, adjustment of an output volume of the response information, or output of at least a part of the response information.

4. The mobile electronic device according to claim 3, wherein the at least one processor is configured to execute the instructions to:
   search for at least one external device connected to the mobile electronic device; and
   identify one of the at least one searched external device based on the response method, and provide the response information to the identified external device.

5. The mobile electronic device according to claim 1, wherein the external device is implemented as a private device of a user, and wherein the private device comprises at least one of a wearable device including augmented reality (AR) glasses or a smart watch, an earphone, or a headphone.

6. The mobile electronic device according to claim 1, wherein the at least one processor is configured to execute the instructions to, based on the surrounding environment being identified as the public location, identify a type of the response information, and identify the providing time point of the response information based on the type of the response information.

7. The mobile electronic device according to claim 1, further comprising:
   a camera configured to obtain the image of the surrounding environment.

8. The mobile electronic device according to claim 1, further comprising:
   a microphone configured to record sound information including the sound information of the surrounding environment,
   wherein the at least one processor is configured to execute the instructions to identify information on a person around the mobile electronic device based on the sound information recorded through the microphone, and identify the surrounding environment based on the identified information.

9. The mobile electronic device according to claim 1, further comprising:
a speaker,
wherein the at least one processor is configured to execute the instructions to control the speaker to output remaining information except for the privacy information from the response information.

10. The mobile electronic device according to claim 1, further comprising:
a display,
wherein the at least one processor is configured to execute the instructions to, based on the surrounding environment being identified as the public location, provide the response information via the display without providing the response information as a voice.

11. A method for controlling a mobile electronic device, the method comprising:
identifying whether response information to a user voice is privacy information;
based on the response information being identified as the privacy information, identifying whether a surrounding environment of the mobile electronic device is a public location based on at least one of an image of the surrounding environment, sound information of the surrounding environment or a current position of the mobile electronic device; and
based on the surrounding environment being identified as the public location, identifying a providing time point of the response information and transmitting the response information to an external device at the providing time point,
wherein the providing time point is when the surrounding environment is identified as a private location.

12. The method according to claim 11, wherein the identifying whether the response information is the privacy information comprises identifying whether the response information is the privacy information based on pre-stored type information corresponding to the privacy information.

13. The method according to claim 11, wherein the transmitting the response information to the external device comprises:
based on the response information being identified as the privacy information, for a first type of the privacy information, provide the response information using a first response method, and for a second type of the privacy information different from the first type of the privacy information, provide the response information using a second response method different from the first response method,
wherein the first response method and the second response method each comprise at least one of encryption of the response information, an output method of the response information, adjustment of an output volume of the response information, or output of at least a part of the response information.

14. The method according to claim 13, wherein the transmitting the response information to the external device comprises:
searching for at least one external device connected to the mobile electronic device; and
identifying one of the at least one searched external device based on the response method, and providing the response information to the identified external device.

15. The method according to claim 11, wherein the external device is implemented as a private device of a user, and
wherein the private device comprises at least one of a wearable device including augmented reality (AR) glasses or a smart watch, an earphone, or a headphone.

16. The mobile electronic device according to claim 1, wherein the at least one processor is configured to execute the instructions to, based on the surrounding environment not being identified as the public location, control a speaker of the mobile electronic device to output the response information.

17. The method according to claim 11, further comprising based on the surrounding environment not being identified as the public location, outputting the response information through a speaker of the mobile electronic device.

* * * * *